Patented Dec. 9, 1947

2,432,255

UNITED STATES PATENT OFFICE 2,432,255

THIOCARBAMOSULFENAMIDES AS FUNGICIDES

Joseph B. Skaptason, Woodbridge, Conn., assignor to United States Rubber Company, New York, N. Y., a corporation of New Jersey No Drawing. Application June 6, 1945, Serial No. 597,962

9 Claims. (Cl. 167—22)

This invention relates to new and useful improvements in fungicides. The invention further relates to methods of treating plants, and to methods of protecting organic material subject to atack by fungi, as the immunizing of seed, and the mildewproofing of fabrics and other material.

I have found that thiocarbamosulfenamides in which the nitrogen of the thiocarbamo group is a tertiary-amino nitrogen and the nitrogen of the sulfenamide group is a primary-, secondary-, or tertiary-amino nitrogen, are effective fungicides. The compounds are known and have been disclosed as accelerators for the vulcanization of rubber (U. S. patents to Tschunker et al. 2,045,888, Cooper 2,333,468 and Hanslick 2,318,482). The structure of the compounds may be represented by the general formula

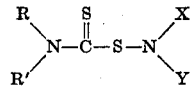

where R and R' each represent an acyclic, alicyclic, heterocyclic, aromatic or aralkyl group or where R and R' in combination represent alkylene (e. g. pentamethylene) or an alkylene containing a hetero O, N or S atom in the chain (e. g. oxydiethylene, iminodiethylene, or thiodiethylene), and where X and Y each represent hydrogen or an acyclic, alicyclic, heterocyclic, aromatic or aralkyl group or where X and Y in combination represent alkylene or an alkylene containing a hetero O, N or S atom in the chain. There is considerable confusion in the technical literature as to the nomenclature of compounds containing the —S—N< linkage. The nomenclature followed in this specification considers the parent compound which would have the formula

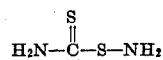

as the amide of the hypothetical thiocarbamosulfenic acid

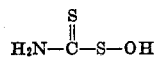

The compound

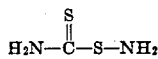

would thus be thiocarbamosulfenamide. There are two amino nitrogens in this formula, one belonging to the thiocarbamo group

and the other to the sulfenamide group —S—NH₂. To differentiate these nitrogens, the thiocarbamo nitrogen labeled "N" and the sulfenamide nitrogen is labeled "N'" in the nomenclature of the compounds. Thus, the thiocarbamo (N) nitrogen is a tertiary amino nitrogen in the compounds of the present invention, and the sulfenamide (N') nitrogen may be a primary, secondary or tertiary nitrogen.

The compounds of the present invention may be used as seed protectants and to protect plants, which term includes plant parts, and soil from microorganisms harmful to seeds and plants. They may also be applied to prevent or retard fungus growth and the formation of, for example, mildew on organic material such as cellulosic material, rope, wood, fur, hair, feathers, cotton, wool, and leather. They may be applied as a dust, undiluted or mixed with a powdered solid carrier, such as clay or talc, or as a liquid or spray in a liquid carrier, as in solution in a suitable solvent, or suspended in a suitable non-solvent, for example, water. Preferably when applied in aqueous suspension, the composition contains a dispersing agent for the chemicals. In seed treatment, the compounds of the present invention are preferably applied to the seeds as by tumbling with the straight chemical, or with the chemical admixed with a powdered solid carrier. In foliage treatment, the compounds of the present invention are preferably applied to the plant parts as by spraying with an aqueous suspension of the chemical containing a dispersing agent. Similar aqueous suspensions are preferred for the mildewproofing of textiles, such as cotton fabrics. The chemicals may be applied as to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The compounds may be used admixed with carriers that are active of themselves, for example, other fungicides, or bactericides, insecticides, insectifuges, fertilizers, hormones, buffering or softening agents.

The following examples are given to illustrate the invention:

*Example I*

Uniform sized tomato plants of the variety Bonney Best (4 to 6 inches tall) were sprayed with aqueous suspensions containing 2000 and 400 parts per million (P. P. M.) respectively of N,N-oxydiethylene thiocarbamosulfenamide,

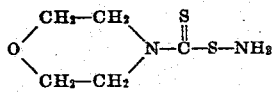

The aqueous suspensions of the compound contained 1 part of Vatsol OS, a commercial dispersing agent (dioctyl sodium sulfo succinate) per 100 parts of the chemical. The spray deposits were allowed to dry on the foliage. The plants together with untreated (check) plants, were uniformly inoculated by spraying onto the foliage an aqueous suspension of spores of *Alternaria solani*, the fungus responsible for a serious blight disease of this crop. The plants were then placed in a chamber at 75° F. and 100% humidity for twenty hours, after which they were removed to normal greenhouse conditions. Sixty hours later, the effectiveness of the chemical was determined by counting the blight lesions on the tomato plants treated with the different dosages of N,N-oxydiethylene thiocarbamosulfenamide, and comparing with the number of blight lesions on the check plants which were not treated with the chemical. The check plants showed an average of 550 blight lesions, whereas the number of lesions on the plants treated with dosages of 2000 and 400 P. P. M. of N,N-oxidiethylene thiocarbamosulfenamide was 27 and 143, respectively.

Example II

Tests similar to Example I with N,N-dimethyl thiocarbamosulfenamide,

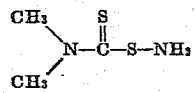

in dosages of 2000, 400, 80 and 16 P. P. M. showed 2, 16, 86 and 274 blight lesions respectively, as compared with 386 lesions on the check plant.

Example III

Tests similar to Example I with N,N-oxydiethylene N'-cyclohexyl thiocarbamosulfenamide

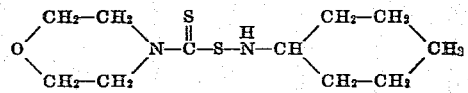

in dosages of 2000, 400, 80 and 16 P. P. M. showed 21, 44, 165 and 220 blight lesions, respectively, as compared to an average of 241 lesions per check plant.

Example IV

Tests similar to Example I with N,N-oxydiethylene N'-isopropyl thiocarbamosulfenamide,

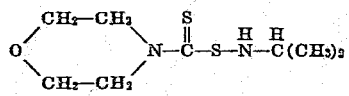

in dosages of 2000, 400, 80 and 16 P. P. M. showed 2, 36, 83 and 166 blight lesions, respectively, as compared to an average of 241 lesions per check plant.

Example V

Tests similar to Example I with an aqueous suspension of 2000 P. P. M. of N,N-dibutyl N'-benzyl thiocarbamosulfenamide,

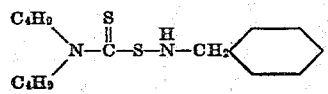

showed 62 blight lesions as compared with 220 lesions on the check plant.

Example VI

Tests similar to Example I with an aqueous suspension of 2000 P. P. M. of N,N-diethyl N'-benzyl thiocarbamosulfenamide,

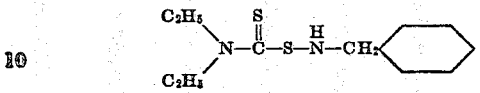

showed 24 blight lesions as compared with 143 lesions on the check plant.

Example VII

Tests similar to Example I with N,N,N',N'-tetraethyl thiocarbamosulfenamide,

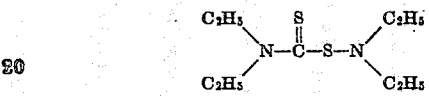

in dosages of 2000, 400, 80 and 16 P. P. M. showed 3, 19, 64 and 165 blight lesions, respectively, compared to an average of 241 lesions per check plant.

Example VIII

Tests similar to Example I with an aqueous suspension of 2000 P. P. M. of N,N,N',N'-tetra n-amyl thiocarbamosulfenamide,

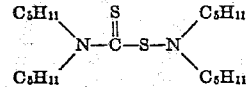

showed 51 blight lesions compared to an average of 220 lesions per check plant.

Example IX

The following illustrates the immunizing of seeds by treatment with thiocarbamosulfenamides of the present invention.

A number of barley seeds, known to be infected with the destructive root rotting fungus *Helminthosporium sativum*, were tumbled with 1% by weight of N,N-dimethyl thiocarbamosulfenamide. Twenty-five of the thus treated seeds and 25 of the infected seeds not treated with any chemical, were placed on pads of filter paper in separate petri dishes which contained 2 cc. of a 2% aqueous dextrose solution, and allowed to stand for seven days at room temperature. After this time, the presence of the fungus on the seeds that were not successfully disinfected could readily be detected by the presence of dark colored Helminthosporium sporulating on the surface of the seeds and in a narrow zone on the filter paper around the seeds. Observations at the end of seven days showed that none of the 25 tested seeds that were treated with N,N-dimethyl thiocarbamosulfenamide developed any fungus growth, whereas all 25 of the tested seeds that were not treated were infected.

Having thus described my invention, what I claim and desire to protect by Letters Patent is:

1. A fungicidal composition comprising a thiocarbamosulfenamide in which the nitrogen of the thiocarbamo group is a tertiary-amino nitrogen and the nitrogen of the sulfenamide group is selected from primary-, secondary-, and tertiary-amino nitrogens as an active ingredient, and a carrier therefor selected from the group consisting of powdered solid carriers, and water containing a dispersing agent.

2. A fungicidal composition comprising an aqueous suspension of a thiocarbamosulfenamide in which the nitrogen of the thiocarbamo group is a tertiary-amino nitrogen and the nitrogen of the sulfenamide group is selected from primary-, secondary-, and tertiary-amino nitrogens, said aqueous suspension containing a dispersing agent.

3. The method of protecting organic material subject to attack by microorganisms which comprises applying to said material a liquid containing a thiocarbamosulfenamide in which the nitrogen of the thiocarbamo group is a tertiary-amino nitrogen and the nitrogen of the sulfenamide group is selected from primary-, secondary-, and tertiary-amino nitrogens.

4. The method of controlling fungi on growing plants which comprises treating the foliage of the plants with a thiocarbamosulfenamide in which the nitrogen of the thiocarbamo group is a tertiary-amino nitrogen and the nitrogen of the sulfenamide group is selected from primary-, secondary-, and tertiary-amino nitrogens.

5. The method of controlling fungi on growing plants which comprises spraying the foliage of the plants with an aqueous suspension of a thiocarbamosulfenamide in which the nitrogen of the thiocarbamo group is a tertiary-amino nitrogen and the nitrogen of the sulfenamide group is selected from primary-, secondary-, and tertiary-amino nitrogens.

6. The method of protecting seeds, plants and soil subject to attack or infestation by fungi which comprises treating said material with a thiocarbamo-sulfenamide in which the nitrogen of the thiocarbamo group is a tertiary-amino nitrogen and the nitrogen of the sulfenamide group is selected from primary-, secondary-, and tertiary-amino nitrogens.

7. The method of protecting seed against attack by microorganisms which comprises treating said seed with a thiocarbamosulfenamide in which the nitrogen of the thiocarbamo group is a tertiary-amino nitrogen and the nitrogen of the sulfenamide group is selected from primary-, secondary-, and tertiary-amino nitrogens.

8. The method of controlling fungi on living organisms which comprises treating said organisms with a thiocarbamosulfenamide in which the nitrogen of the thiocarbamo group is a tertiary-amino nitrogen and the nitrogen of the sulfenamide group is selected from primary-, secondary-, and tertiary-amino nitrogens.

9. The method of controlling mildew on textiles which comprises treating said textiles with a thiocarbamosulfenamide in which the nitrogen of the thiocarbamo group is a tertiary-amino nitrogen and the nitrogen of the sulfenamide group is selected from primary-, secondary-, and tertiary-amino nitrogens.

JOSEPH B. SKAPTASON.

REFERENCES CITED

The following references are of record in the file of this patent:

UNITED STATES PATENTS

| Number | Name | Date |
| --- | --- | --- |
| 2,139,935 | Claudin | Dec. 13, 1938 |
| 2,187,719 | Williams | Jan. 23, 1940 |